W. A. GEIGER.
FRICTION SHOCK ABSORBING MECHANISM.
APPLICATION FILED SEPT. 8, 1921.
1,429,581.
Patented Sept. 19, 1922.
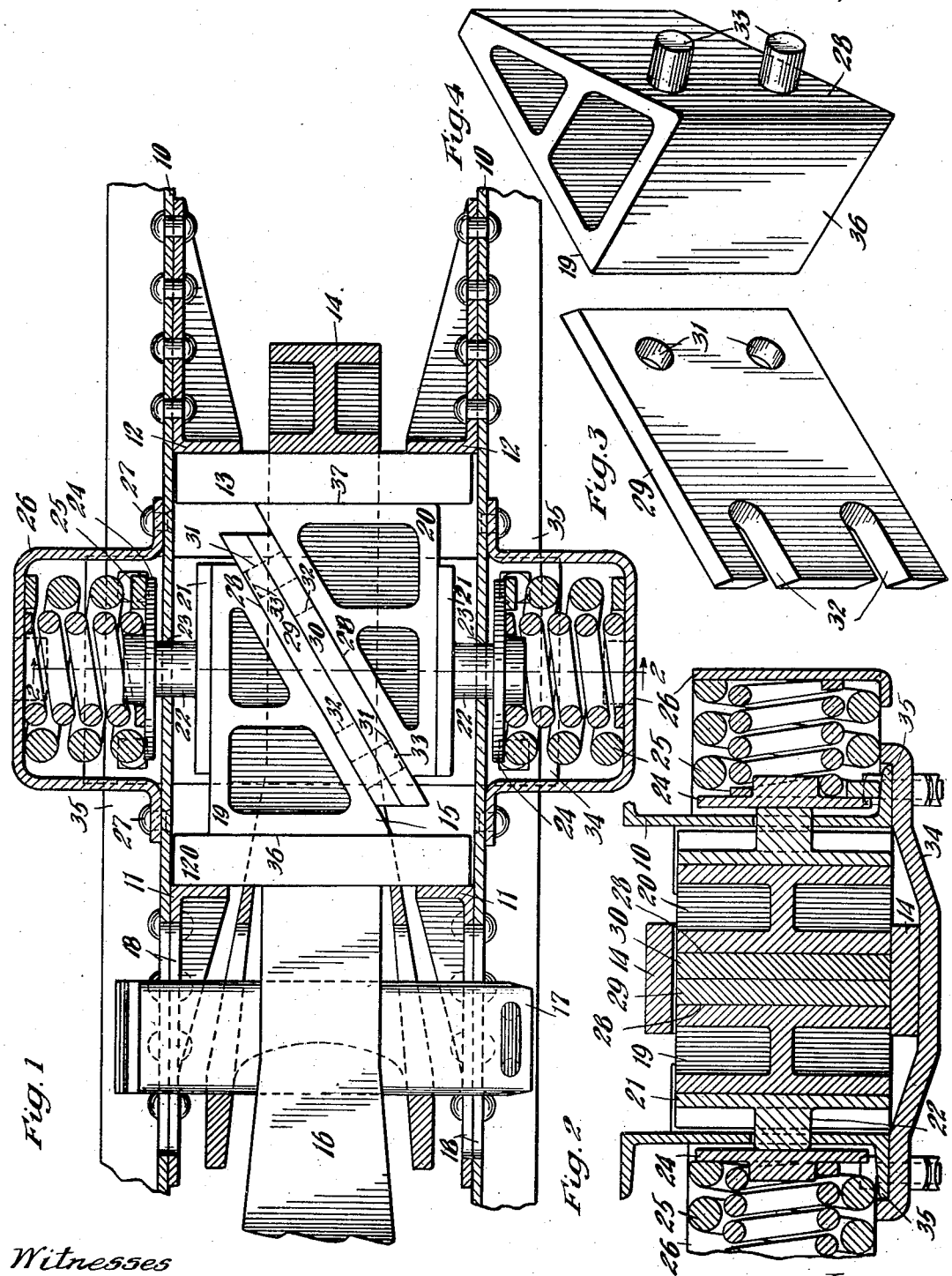
Witnesses
Inventor
William A. Geiger
By Geo. I. Haight
Atty.

Patented Sept. 19, 1922.

1,429,581

UNITED STATES PATENT OFFICE.

WILLIAM A. GEIGER, OF CHICAGO, ILLINOIS, ASSIGNOR TO WILLIAM H. MINER, OF CHAZY, NEW YORK.

FRICTION SHOCK-ABSORBING MECHANISM.

Application filed September 8, 1921. Serial No. 499,142.

*To all whom it may concern:*

Be it known that I, WILLIAM A. GEIGER, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a simple and efficient draft rigging for railway cars, having comparatively few parts and a large friction area in the shock-resisting mechanism.

Other objects of the invention will appear from the description of an embodiment of the invention hereinafter following.

In the drawing forming a part of this specification, Figure 1 is a horizontal section partly in top plan view of a railway draft rigging embodying the invention. Figure 2 is a cross-section taken on the line 2—2 of Figure 1. Figure 3 is a perspective view of a friction block supplemental friction plate. And Figure 4 is a perspective view of one of the friction blocks.

Referring to the drawing, the numerals 10 indicate draft members or sills, being the parts of the car underframe to which the draft rigging is applied. Front and rear stops 11—11 and 12—12 respectively are suitably secured to the inner faces of the sills, the rear stops 12 being in normal position of the parts and in buffing action engaged by the rear follower 13 and the front stops in normal position and in pulling action being engaged by the front follower 120. A yoke 14 surrounds the friction mechanism 15 and is slidingly engaged at its forward end to the drawbar 16 by means of the coupler key 17 which, at its ends, extends through the registering slots 18—18 provided in the front stop members and draft sills.

The friction mechanism includes a front friction block 19 and a rear friction block 20. The said friction blocks are counterparts and each, in general plan view, presents a face that is substantially a right-angled triangle. Each friction block is engaged on its outer side by a friction plate 21, from which there is a lateral outwardly extending stem 22 passing through a perforation 23 in the adjacent draft member and provided at its outer end with a spring seat 24 to receive the inner end of the spring member 25. The outer end of the spring member is seated within the stirrup or cap 26, which is secured to the adjacent draft member 10 by the rivets 27—27. The front friction block 19 engages the front follower 120, and the rear friction block 20 engages the rear follower 13. The long inner sides of the friction blocks, indicated at 28, which extend obliquely to the axis of the yoke, are opposed to each other and have mounted between them a pair of friction block supplemental friction plates, 29 indicating the one that rides upon the front friction block, and 30 the one that rides upon the rear friction block. These friction block supplemental friction plates are substantially counterparts, having near one end the pin or stud holes 31—31 and at the other end the pin or stud slots 32—32. Each of the friction blocks is provided, upon its inner face 28, with the studs or pins 33, the said studs passing from the block on which they are formed through the slots 32 in the adjacent plate and entering the pin holes 31 in the opposed plate; for instance, the studs 33 on the front friction block pass through the slots 32 in the friction block supplemental friction plate 29 and engage within the stud holes 31 in the friction block supplemental friction plate 30, and similarly the studs 33 upon the rear friction block 20 pass through the stud slots 32 in the friction block supplemental friction plate 30 and enter the stud holes 31 in the plate 29. Thus, as will be more fully explained hereinafter, the supplemental friction plate adjacent a friction block will, upon the movement of the block in one direction, itself move in the other direction in frictional engagement with the block.

The yoke and the parts between the draft members within it are supported by a tie plate 34 which is bolted at its ends to the lower flanges 35 of the draft members. An examination of the operation of the device described will reveal that a large frictional area between the parts can be provided in a comparatively small space. On rearward movement of the drawbar the front follower is forced rearwardly pressing against the front face 36 of the front friction block 19, which moves rearwardly and outwardly generating friction between it and the front follower. Its rearward movement generates friction between it and the side friction plate 21. The rear friction block 20 is held against rearward movement by the rear follower 13, and it, through the transmission of force from the front block 19 to it, through the intermediate supplemental friction plates, will move outwardly, its rear face 37 being in frictional engagement with the rear follower 13. Its outer face will engage against the adjacent friction plate 21 and during movement all of the frictional elements will be held together and their spreading movement resisted by the yielding spring members 25. As the front friction block 29 moves rearwardly, its pins 33 will carry the supplemental friction plate 30 rearwardly with it generating friction, between the supplemental friction plate 30 and the adjacent friction plate 28 of the rear friction block 20, and also between the friction block 30 and its companion supplemental friction plate 29. The studs 33 on the front friction block 19 will move freely in the longitudinal slots 32 in the friction plate 29, imparting no motion to it. The supplemental friction plate 29 will be held against movement by the studs 33 extending from the rear friction block through the slots 32 in the friction plate 30, and thus, as the front friction block 19 moves rearwardly its face 28 will generate friction against the adjacent face of the supplemental friction plate 29. On forward movement of the drawbar the action is similar to that described, except that in such movement the rear friction block will move forwardly under the impulse of the rear follower 13 as it is drawn forwardly by the yoke and the front friction block 19 will be restrained of longitudinal movement by the front follower 120 and will have lateral movement only.

The foregoing makes clear that each of the friction blocks has a sliding frictional engagement with adjacent friction members on all three faces, and in addition thereto each block operates a further friction-generating device paralleling and opposed to one of its surfaces which largely increases the frictional area provided, and this is accomplished by the comparatively slight spacing apart of the friction blocks and interposing the friction blocks supplemental friction plates, each having a movement independent of its adjacent friction block.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with oppositely parallel moving friction members, of supplemental friction plates interposed between said members, the plate adjacent one member being actuated by the other member.

2. In a friction shock absorbing mechanism, the combination with oppositely parallel moving friction members, of a pair of supplemental friction plates interposed between said members, each of said members being provided with means which move freely in the adjacent friction plate and engage and actuate the other friction plate.

3. In a friction shock absorbing mechanism, the combination with a pair of friction members, of a pair of supplemental friction plates interposed between them, each friction member being provided with a stud, each supplemental friction plate having a slot, the stud passing through the slot in the adjacent supplemental friction plate and engaging and actuating the other friction plate.

4. In a friction shock absorbing mechanism, the combination with a pair of spaced apart friction members, of a pair of supplemental friction blocks interposed between them, each friction block having a stud, each plate being provided with a stud hole and a slot, the stud on each block passing through the slot in the adjacent friction plate and entering the stud hole of the other friction plate.

5. In a friction shock absorbing mechanism, the combination with a pair of friction blocks having opposed parallel oppositely moving friction faces, of supplemental friction plates interposed between said faces, each friction block having a plurality of studs, each friction plate having slots and holes therein, the studs on one friction block passing through the slots in the adjacent plate and entering the holes in the opposite plate, whereby the plate adjacent one block moves with and is actuated by the other block.

6. In a friction shock absorbing mechanism, the combination with followers, of friction blocks mounted between said followers and spring members pressing said friction blocks toward each other, of friction plates between each spring and a friction block, a pair of supplemental friction plates between said blocks, each of said friction blocks being provided with means passing through the adjacent supplemental friction plate and engaging and actuating the other supplemental friction plate.

7. In a friction shock absorbing mechanism, the combination with draft members, of followers mounted between said members, a pair of friction blocks between said followers and springs pressing said friction blocks toward each other, of outer friction plates and supplemental friction plates, the friction blocks being each substantially a right-angled triangle in horizontal section, with one of its shorter faces engaging a follower, its other shorter face engaging an outer friction plate, its longer face engaging a supplemental friction plate, the last mentioned face being provided with means adapted to move freely of the adjacent supplemental friction plate and to actuate the other supplemental friction plate.

8. In a friction shock absorbing mechanism, the combination with draft members, of stop members and followers mounted between the same, a pair of friction blocks mounted between the said followers, springs mounted outside the draft members, means pressed by said springs passing through the draft members and engaging the friction blocks, of supplemental friction plates mounted between the friction blocks, the friction blocks being each substantially a right-angled triangle in horizontal section with the long sides of said friction blocks opposed to each other, the supplemental friction plates being slotted, the friction blocks each having studs passing through the slots in the adjacent supplemental friction plate and entering and actuating the other friction plate.

In witness that I claim the foregoing I have hereunto subscribed my name this 26th day of Aug. 1921.

WILLIAM A. GEIGER.

Witnesses:
CARRIE GAILING
UNA C. PERIN.